June 16, 1942.     F. B. BUFFINGTON     2,286,711
AUTOMATIC BRAKE WEAR ADJUSTMENT MECHANISM
Filed Dec. 31, 1940
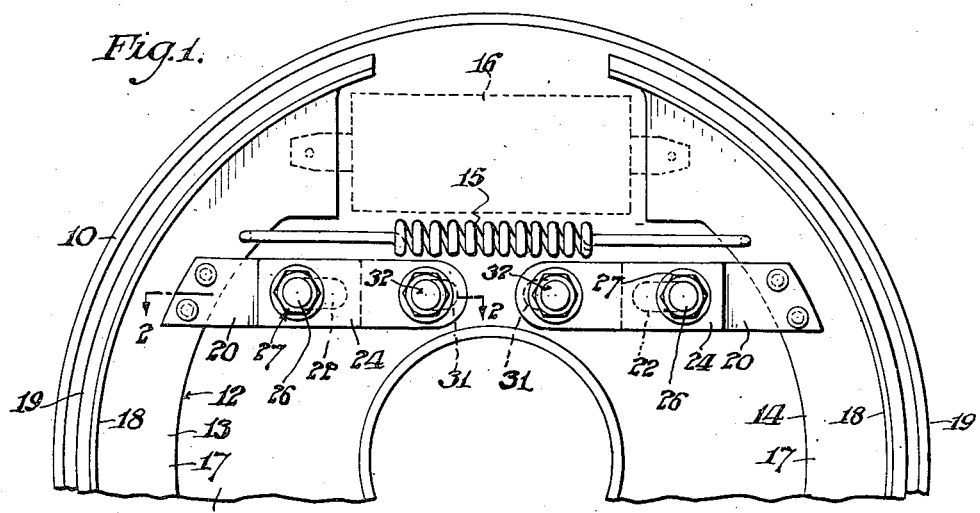
Fig.1.
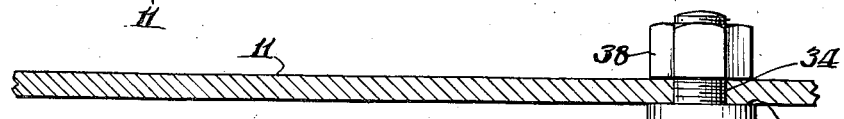
Fig.2.
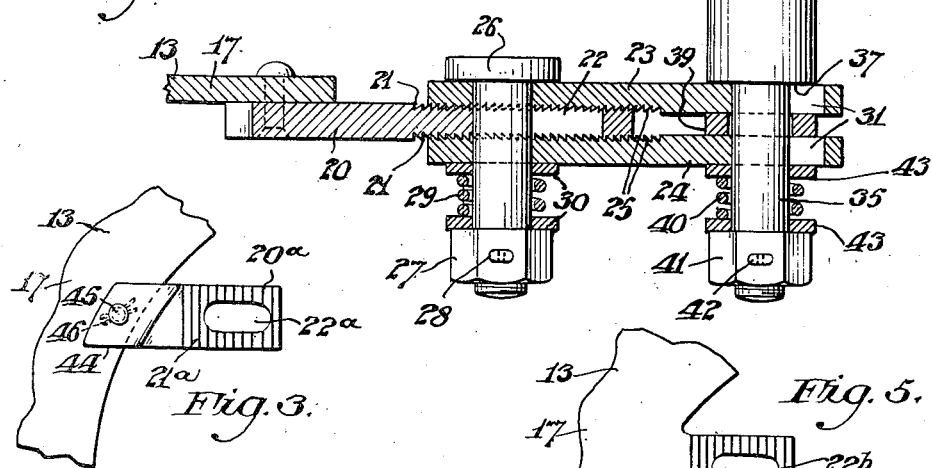
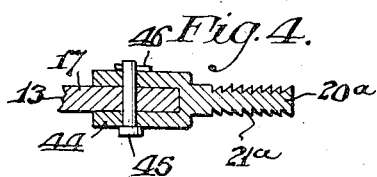
Fig.3.
Fig.4.
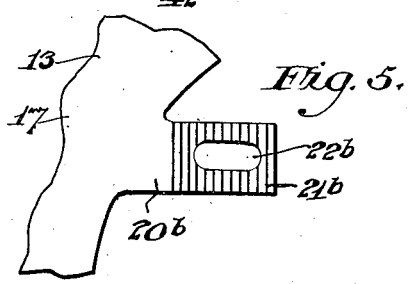
Fig.5.
Inventor:
Frank B. Buffington,
By W. W. Williamson
Attorney.

Patented June 16, 1942

2,286,711

UNITED STATES PATENT OFFICE 2,286,711

AUTOMATIC BRAKE WEAR ADJUSTMENT MECHANISM

Frank B. Buffington, Chester, Pa.

Application December 31, 1940, Serial No. 372,449

4 Claims. (Cl. 188—79.5)

My invention relates to a new and useful automatic brake wear adjustment mechanism and has for one of its objects to provide means to maintain a constant distance relation between the braking surfaces within certain predetermined limits.

As the invention is particularly adapted for use in connection with automobile and other similar brakes, an object of this invention is to construct an apparatus that may be readily applied to existing brakes as well as incorporated in new ones during the course of manufacture.

Another object of the invention is to provide an exceedingly simple and effective device of the character mentioned for automatically taking up the wear of the brake linings.

Another object of the invention is to provide a brake adjuster wherein the adjustment takes place automatically as the brake elements wear to practically maintain a constant distance between the working surfaces and cause the throw of the brake pedal or other operating mechanism to remain substantially equal at all times.

A further object of the invention is the provision of a friction brake including a self adjusting or automatic take-up device operable by the ordinary actuation of the brake to compensate for wear on the brake parts.

A still further object of the invention is to construct an automatic brake wear adjuster which, in effect, is an automatically adjustable stop mechanism to limit the retraction of the brake blocks consisting of the shoes and their linings in the ordinary automotive vehicle brake.

With the above and other objects in view, this invention consists of the details of construction and combination of elements hereinafter set forth and then designated by the claims.

In order that those skilled in the art to which this invention appertains may understand how to make and use the same, I will describe its construction, referring by numerals to the accompanying drawing forming a part hereof, in which:

Fig. 1 is an elevation of the inside of a portion of a brake structure illustrating the automatic brake wear adjustment mechanism applied thereto.

Fig. 2 is an enlarged fragmentary sectional elevation on the line 2—2 of Fig. 1.

Fig. 3 is a side elevation of a portion of a brake block and a modified form of ratchet arm.

Fig. 4 is a sectional view thereof.

Fig. 5 is a side elevation of a further modification.

In carrying out my invention as herein embodied 10 represents the usual brake drum carried by a vehicle wheel or other revolving apparatus and with the brake drum is associated a relatively stationary wall 11, such as a dust pan or apron used to keep out foreign matter, for instance, dust, mud, rain and the like.

Cooperating with the brake drum is a brake block 12 of any suitable construction and for purposes of illustration such block is shown as including two brake shoes 13 and 14, one end of each pivoted as usual and the free ends being urged in one direction by a spring 15 and actuated in the opposite direction by any suitable brake operating means generally, but not necessarily, controlled by a pedal. For purposes of illustration there is shown in dotted lines, a wheel cylinder 16 carrying the pistons which are connected to the brake shoes. These brake shoes each include a web 17 and a head 18 on which the brake lining 19 is mounted.

Both brake shoes 13, 14 carry a ratchet arm 20 which, as shown in Figs. 1 and 2, may be riveted or otherwise secured to said brake shoes and particularly to the webs thereof, and each arm constitutes an element of one adjusting unit.

On at least one and preferably both faces of the ratchet arm are formed teeth 21 and said arm has a longitudinally elongated aperture or slot 22 therethrough within the toothed area or in the region of said teeth.

A pair of companion jaws 23 and 24, at least one and preferably both of which have teeth 25 on their inner or opposed faces for coaction with the teeth 21 on the ratchet arm 20. A bolt 26 or equivalent means is projected through holes in the companion jaws and the aperture 22 in the ratchet arm and a nut 27 mounted on the bolt and said bolt may be held against accidental displacement by a cotter key 28 or other nut lock.

Between the nut 27 and one of the companion jaws, as jaw 24, is a spring 29 which urges both jaws toward and into engagement with the ratchet arm 20 so the teeth 25 coact with the teeth 21 and, if desirable, washers 30 may be disposed between the ends of the spring and the adjacent jaw and nut respectively.

The jaws 23 and 24 of each unit have elongated apertures or slots 31 extending longitudinally thereof at their inner ends for slidably mounting said jaws on a supporting trunnion 32 carried by and preferably attached to the wall 11. A convenient construction for this supporting trunnion consists of a headless or double ended bolt fashioned to provide a body 33 from one end of which projects a reduced externally threaded shank 34 and from the other end of said body projects a reduced neck 35 only the terminal of which is threaded. The difference between the sizes of the body, and shank and neck provides shoulders 36 and 37.

The shank 34 is inserted in a hole in the wall 11 until the shoulder 36 contacts a face of said wall and a nut 38 is screwed onto the shank to hold the supporting trunnion in place. To mount the jaws 23, 24 they are slipped over the neck 35, with the spacer 39 between them, until said jaws, particularly one of them, as 23, engages the shoulder 37. Next a spring 40 is placed on the neck 35 and finally a nut 41 is screwed onto the threaded terminal of the neck for adjusting the tension of the spring which will hold the jaws in proper relation. The nut may be held in place by a cotter key 42 or other nut lock and washers 43 may be placed at the ends of the said spring.

In lieu of the ratchet arm 20, another one 20a, Figs. 3 and 4, can be utilized. This is especially adapted for easy assembly and includes a bifurcated portion 44 similar to a shackle to embrace the web of the brake shoe and held in place by a pin 45 with a cotter key 46 through it. Said ratchet arm 20a is also provided with teeth 21a and an elongated aperture or slot 22a.

As a substitute for either of the aforementioned ratchet arms, a ratchet arm 20b can be formed integral with the web 17 of a brake shoe as shown in Fig. 5. Such a ratchet arm, like the others, has teeth 21b and an elongated aperture or slot 22b.

In all instances the teeth on the ratchet arm are opposed to those on the jaws of the same unit, so that in operation the arm and jaws cannot contract, collapse or telescope relative to one another but under certain conditions, as when the jaws are stopped from moving outwardly and the arm can move, said parts can be relatively extended or expanded.

When this adjustment device is employed the working surfaces of the brakes are maintained at an almost constant distance apart when retracted thereby providing for a substantially regular movement of the brake pedal or other operating mechanism regardless of the wear that takes place. With the teeth on the ratchet arm and jaws spaced approximately one-eighth of an inch apart, the variance of the movement between the brake lining and drum will be slightly less than one-thirty-second of an inch.

In practice, when the brake shoes are forced outward or towards the brake drum in any well known or suitable manner to cause an application of the brake and when released the spring 15 or other equivalent means retracts the brake shoes. During the actuation of the brake shoes the adjustment mechanism units as a whole merely move to and fro by sliding on their supporting trunnions within the limits of the slots 31, but the retracting action of the brake shoes is arrested when the walls forming the inner ends of said slots (considered with relation to the jaws) contact the supporting trunnion as shown in Fig. 2. Whenever the brake lining is worn to such an extent that movement of the jaws is stopped before the brake takes hold, the ratchet arms 20 will partly pull out of said jaws which is possible because of the resilient or spring action of these jaws on said ratchet arms. If the slightly additional movement necessary to provide an application of the brake is not sufficient to completely disengage the ten meshed teeth, the parts will slip back to their original relative positions as the brake shoes are retracted. When the brake lining has worn to such an extent that an application of the brake causes the ratchet arms to move the width of a tooth, said arms will slip a distance equal thereto and the teeth will remesh in the new location, thus automatically providing a different adjustment in which each unit is further extended. Thereafter, the clearance between the brake lining and drum will be the same as when the lining was new or after a previous adjustment.

It is to be particularly noted that the structure herein described can be readily assembled on any brake in use by merely drilling a few holes, or by drilling two holes for the supporting trunnions and substituting brake shoes with integral ratchet arms like in Fig. 5 for the original brake shoes. In new or original installations the supporting trunnions can be provided for and any of the several forms of the brake shoe ratchet arms utilized but that illustrated in Fig. 5 is especially adapted for this purpose.

Of course I do not wish to be limited to the exact details of construction herein shown and described, as these may be varied within the scope of the appended claims without departing from the spirit of my invention.

Having described my invention, what I claim as new and useful is:

1. A unit of a brake adjuster comprising a supporting trunnion to be fixed to a wall of a brake structure, a pair of spaced complementary jaws longitudinally slidably mounted on said supporting trunnion, means to resiliently urge said jaws towards one another in the region of the trunnion, a series of teeth on the inside face of one of said jaws, a ratchet arm for connection with a brake shoe and projecting in between the jaws, a series of teeth on said arm for coaction with the jaw teeth, said arm having a longitudinally elongated aperture in the region of the teeth on said arm, a bolt projected through the jaws and passing through the elongated aperture, and means to resiliently urge said jaws towards one another in the region of the bolt.

2. The structure in claim 1 wherein series of teeth are provided on the inner faces of both jaws and series of teeth are provided on both faces of the ratchet arm.

3. A brake adjuster unit comprising a supporting trunnion including a body and a reduced shank at one end and a reduced neck at the other end, said shank and the terminal end of said neck having threads thereon, said shank to be projected through a hole in a wall of a brake structure and receive a nut for holding the supporting trunnion in place, a pair of jaws having longitudinally elongated apertures for mounting said jaws on the neck of the trunnion for longitudinal sliding movement, a spacer washer on said neck between the jaws, a nut on the terminal end of the neck, a spring between the nut on the neck and the adjacent jaw, a series of teeth on the inner faces of both jaws, a ratchet arm for connection with a brake shoe and having an end projecting in between the jaws, said projecting end having a longitudinally elongated aperture, teeth on both faces of said ratchet arm for coaction with the teeth on the jaws, a bolt projected through said jaws and passing through the elongated aperture in the ratchet arm, a nut on said bolt, and a spring between the nut on the bolt and the adjacent jaw.

4. The combination with a brake including a wall and a drum and shoes, of an adjustment unit for each shoe, each unit comprising a supporting means mounted on the wall, jaws mounted in spaced relation on the supporting means and having a limited longitudinal sliding movement on said supporting means, teeth on the inner faces of said jaws, a ratchet arm carried by a shoe and fitted in between the jaws, teeth on both faces of said ratchet arm, the teeth on the jaws and arm being fashioned to permit only an extension movement of said arm relative to the jaws, and means to resiliently urge said jaws toward each other at two spaced locations, one in the region of the supporting means and the other in the region of the teeth.

FRANK B. BUFFINGTON.